(12) United States Patent
Morris (10) Patent No.: US 9,067,379 B2
(45) Date of Patent: Jun. 30, 2015

(54) STIFFENED MULTI-LAYER COMPARTMENT DOOR ASSEMBLY UTILIZING ELASTIC AVERAGING

(75) Inventor: Steven E. Morris, Fair Haven, MI (US)

(73) Assignee: GM Global Technologies Operations LLC, Detroit, MI (US)

(*) Notice: Subject to any disclaimer, the term of this patent is extended or adjusted under 35 U.S.C. 154(b) by 350 days.

(21) Appl. No.: 13/459,118

(22) Filed: Apr. 28, 2012

(65) Prior Publication Data

US 2013/0287992 A1    Oct. 31, 2013

(51) Int. Cl.
| | | |
|---|---|---|
| *B32B 3/06* | (2006.01) |
| *B60J 10/08* | (2006.01) |
| *B60J 1/08* | (2006.01) |
| *B32B 3/02* | (2006.01) |
| *B32B 3/30* | (2006.01) |
| *E06B 3/70* | (2006.01) |
| *B60R 13/02* | (2006.01) |
| *B32B 7/04* | (2006.01) |

(52) U.S. Cl.
CPC ........... *B32B 3/02* (2013.01); *Y10T 428/24008* (2015.01); *Y10T 428/24* (2015.01); *B32B 3/30* (2013.01); *E06B 3/70* (2013.01); *B60R 13/0256* (2013.01); *B32B 7/04* (2013.01); *B32B 2307/51* (2013.01); *B32B 2307/544* (2013.01); *B32B 2605/08* (2013.01)

(58) Field of Classification Search
CPC ........ B32B 3/02; B32B 3/30; B60R 13/0256; E06B 3/70; Y10T 428/24; Y10T 428/24008
USPC .......................... 428/99, 98; 296/146.9, 146.1
See application file for complete search history.

(56) References Cited

U.S. PATENT DOCUMENTS

| | | | |
|---|---|---|---|
| 1,301,302 | A | 4/1919 | Nolan |
| 1,819,126 | A | 8/1931 | Scheibe |
| 1,982,076 | A | 11/1934 | Spahn |
| 2,006,525 | A | 7/1935 | Bernhard |
| 2,482,488 | A | 9/1949 | Franc |
| 2,688,894 | A | 9/1954 | Modrey |
| 2,778,399 | A | 1/1957 | Mroz |
| 2,780,128 | A | 2/1957 | Rapata |
| 2,862,040 | A | 11/1958 | Curran |
| 2,902,902 | A | 9/1959 | Slone |

(Continued)

FOREIGN PATENT DOCUMENTS

| | | |
|---|---|---|
| CN | 2888807 Y | 4/2007 |
| CN | 2915389 Y | 6/2007 |

(Continued)

OTHER PUBLICATIONS

U.S. Appl. No. 13/187,675, filed on Jul. 21, 2011, titled "Elastic Tube Alignment System for Precisely Locating Components"—Inventor: Steven E. Morris.

(Continued)

*Primary Examiner* — Brent O'Hern
(74) *Attorney, Agent, or Firm* — Cantor Colburn LLP (57) ABSTRACT

A stiffened multi-layer assembly composed of an inner layer and an outer layer mutually aligned by elastic averaging at the peripheral interface therebetween which provides both a precise alignment and a torsionally stiffened structural configuration when the first and second layers are mutually mated and snapped together to form the stiffened multi-layer assembly.

16 Claims, 6 Drawing Sheets

(56) References Cited

U.S. PATENT DOCUMENTS

| | | |
|---|---|---|
| 3,005,282 A | 10/1961 | Christiansen |
| 3,014,563 A | 12/1961 | Bratton |
| 3,087,352 A | 4/1963 | Daniel |
| 3,130,512 A | 4/1964 | Van Buren, Jr. |
| 3,168,961 A | 2/1965 | Yates |
| 3,194,292 A | 7/1965 | Borowsky |
| 3,213,189 A | 10/1965 | Mitchell et al. |
| 3,233,358 A | 2/1966 | Dehm |
| 3,233,503 A | 2/1966 | Birger |
| 3,244,057 A | 4/1966 | Mathison |
| 3,531,850 A | 10/1970 | Durand |
| 3,643,968 A | 2/1972 | Horvath |
| 3,842,565 A | 10/1974 | Brown et al. |
| 3,895,408 A | 7/1975 | Leingang |
| 3,905,570 A | 9/1975 | Nieuwveld |
| 4,158,511 A | 6/1979 | Herbenar |
| 4,213,675 A | 7/1980 | Pilhall |
| 4,394,853 A | 7/1983 | Lopez-Crevillen et al. |
| 4,406,033 A | 9/1983 | Chisholm et al. |
| 4,481,160 A | 11/1984 | Bree |
| 4,605,575 A | 8/1986 | Auld et al. |
| 4,767,647 A | 8/1988 | Bree |
| 4,805,272 A | 2/1989 | Yamaguchi |
| 5,139,285 A | 8/1992 | Lasinski |
| 5,234,122 A | 8/1993 | Cherng |
| 5,397,206 A | 3/1995 | Sihon |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,577,301 A | 11/1996 | Demaagd |
| 5,577,779 A | 11/1996 | Dangel |
| 5,580,204 A | 12/1996 | Hultman |
| 5,601,453 A | 2/1997 | Horchler |
| 5,634,757 A | 6/1997 | Schanz |
| 5,698,276 A | 12/1997 | Mirabitur |
| 5,736,221 A | 4/1998 | Hardigg et al. |
| 5,806,915 A | 9/1998 | Takabatake |
| 5,810,535 A | 9/1998 | Fleckenstein et al. |
| 5,941,673 A | 8/1999 | Hayakawa et al. |
| 6,193,430 B1 | 2/2001 | Culpepper et al. |
| 6,209,178 B1 | 4/2001 | Wiese et al. |
| 6,264,869 B1 | 7/2001 | Notarpietro et al. |
| 6,321,495 B1 | 11/2001 | Oami |
| 6,354,815 B1 | 3/2002 | Svihla et al. |
| 6,378,931 B1 | 4/2002 | Kolluri et al. |
| 6,398,449 B1 | 6/2002 | Loh |
| 6,484,370 B2 | 11/2002 | Kanie et al. |
| 6,485,241 B1 | 11/2002 | Oxford |
| 6,533,391 B1 | 3/2003 | Pan |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,677,065 B2 | 1/2004 | Blauer |
| 6,840,969 B2 | 1/2005 | Kobayashi et al. |
| 6,857,676 B2 | 2/2005 | Kawaguchi et al. |
| 6,932,416 B2 | 8/2005 | Clauson |
| 6,948,753 B2 | 9/2005 | Yoshida et al. |
| 6,959,954 B2 | 11/2005 | Brandt et al. |
| 6,971,831 B2 | 12/2005 | Fattori et al. |
| 7,008,003 B1 | 3/2006 | Hirose et al. |
| 7,014,094 B2 | 3/2006 | Alcoe |
| 7,036,779 B2 | 5/2006 | Kawaguchi et al. |
| 7,089,998 B2 | 8/2006 | Crook |
| 7,178,855 B2 | 2/2007 | Catron et al. |
| 7,198,315 B2 | 4/2007 | Cass et al. |
| 7,306,418 B2 | 12/2007 | Kornblum |
| 7,322,500 B2 | 1/2008 | Maierholzner |
| 7,344,056 B2 | 3/2008 | Shelmon et al. |
| 7,557,051 B2 | 7/2009 | Ryu et al. |
| D602,349 S | 10/2009 | Andersson |
| 7,764,853 B2 | 7/2010 | Yi et al. |
| 7,793,998 B2 | 9/2010 | Matsui et al. |
| 7,802,831 B2 | 9/2010 | Isayama et al. |
| 7,828,372 B2 | 11/2010 | Ellison |
| 7,862,272 B2 | 1/2011 | Nakajima |
| 7,883,137 B2 | 2/2011 | Bar |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,261,581 B2 | 9/2012 | Cerruti et al. |
| 8,297,137 B2 | 10/2012 | Dole |
| 8,444,199 B2 | 5/2013 | Takeuchi et al. |
| 8,695,201 B2 | 4/2014 | Morris |
| 2002/0045086 A1 | 4/2002 | Tsuji et al. |
| 2002/0092598 A1 | 7/2002 | Jones et al. |
| 2002/0136617 A1 | 9/2002 | Imahigashi |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0131896 A1 | 7/2004 | Blauer |
| 2004/0139678 A1 | 7/2004 | Pervan |
| 2004/0208728 A1 | 10/2004 | Fattori et al. |
| 2005/0031946 A1 | 2/2005 | Kruger et al. |
| 2005/0244250 A1 | 11/2005 | Okada et al. |
| 2006/0102214 A1 | 5/2006 | Clemons |
| 2006/0141318 A1 | 6/2006 | MacKinnon et al. |
| 2006/0197356 A1 | 9/2006 | Catron et al. |
| 2007/0144659 A1 | 6/2007 | De La Fuente |
| 2007/0292205 A1 | 12/2007 | Duval |
| 2008/0094447 A1 | 4/2008 | Drury et al. |
| 2008/0217796 A1 | 9/2008 | Van Bruggen et al. |
| 2008/0260488 A1 | 10/2008 | Scroggie et al. |
| 2009/0134652 A1 | 5/2009 | Araki |
| 2009/0174207 A1 | 7/2009 | Lota |
| 2010/0021267 A1 | 1/2010 | Nitsche |
| 2010/0102538 A1 | 4/2010 | Paxton et al. |
| 2010/0270745 A1 | 10/2010 | Hurlbert et al. |
| 2011/0076588 A1 | 3/2011 | Yamaura |
| 2011/0207024 A1 | 8/2011 | Bogumil et al. |
| 2011/0296764 A1 | 12/2011 | Sawatani et al. |
| 2012/0115010 A1 | 5/2012 | Smith et al. |
| 2013/0019455 A1 | 1/2013 | Morris |
| 2013/0157015 A1 | 6/2013 | Morris |
| 2015/0016918 A1 | 1/2015 | Colombo |

FOREIGN PATENT DOCUMENTS

| | | |
|---|---|---|
| CN | 101250964 A | 4/2008 |
| CN | 201268336 Y | 7/2009 |
| CN | 201703439 U | 1/2011 |
| CN | 201737062 U | 2/2011 |
| CN | 201792722 U | 4/2011 |
| CN | 202079532 U | 12/2011 |
| DE | 3704190 A1 | 12/1987 |
| DE | 3711696 A1 | 10/1988 |
| DE | 3805693 A1 | 2/1989 |
| DE | 69600357 T2 | 12/1998 |
| DE | 10234253 B3 | 4/2004 |
| DE | 102008005618 A1 | 7/2009 |
| DE | 102010028323 A1 | 11/2011 |
| DE | 102011050003 A1 | 10/2012 |
| EP | 0118796 | 9/1984 |
| EP | 1132263 A1 | 9/2001 |
| EP | 1293384 A2 | 3/2003 |
| EP | 1273766 A1 | 8/2003 |
| EP | 2450259 A1 | 5/2012 |
| JP | 2001171554 A | 6/2001 |
| JP | 2005268004 | 9/2005 |
| JP | 2006205918 | 8/2006 |
| JP | 2009084844 | 4/2009 |
| WO | 2008140659 A1 | 11/2008 |

OTHER PUBLICATIONS

U.S. Appl. No. 13/229,926, filed on Sep. 12, 2011, titled "Using Elastic Averaging for Alignment of Battery Stack, Fuel Cell Stack, or Other Vehicle Assembly"—Inventors: MArk A. Smith, Ronald Daul, Xiang Zhao, David Okonski, Elmer Santos, Lane Lindstrom and Jeffrey A. Abell.

(56) References Cited

OTHER PUBLICATIONS

U.S. Appl. No. 13/330,718, filed on Dec. 20, 2011, titled "Precisely Locating Components in An Infrared Welded Assembly"—Inventor: Steven E. Morris.

U.S. Appl. No. 13/567,580, filed on Aug. 6, 2011, titled "Semi-Circular Alignment Features of an Elastic Averaging Alignment System"—Inventors: Steven E. Morris and Thomas F. Bowles.

U.S. Appl. No. 13/570,959, filed on Aug. 9, 2012, titled "Elastic Cantilever Beam Alignment System for Precisely Aligning Components"—Inventor: Steven E. Morris.

Awtar, S. & Sevincer, E. (Sep. 2006). Elastic Averaging in Flexure Mechanisms: A Multi-Beam Parallelogram Flexure Case-Study. From the Proceedings of IDETC/CIE 2006, Paper DETC2006-99752, American Society of Mechanical Engineers (ASME).

Balasubramaniam, M., Golaski, E., Son, S., Sriram, K. & Slocum, A. (Jul. 2002). An Anti Backlash Two-Part Shaft Coupling with Interlocking Elastically Averaged Teeth. Precision Engineering, vol. 26, No. 3, Elsevier Publishing.

DeVita, L., Plante, J. & Dubowsky, S. (Jun. 2007). The Design of High Precision Parallel Mechanisms using Binary Actuation and Elastic Averaging: With Application to MRI Cancer Treatment., 12th IFToMM World Congress, Besancon (France).

Gurung, S. (Dec. 2007). Passive Alignment of Micro-Fluidic Chips Using the Principle of Elastic Averaging. Thesis: Louisiana State University, Dept. of Mechanical Engineering.

U.S. Appl. No. 13/571,030, filed on Aug. 9, 2012, entitled "Elastic Tube Alignment System for Precisely Locating an Emblem Lens to an Outer Bezel", inventors: Joel Colombo, Steven E. Morris, and Michael D. Richardson.

Willoughby, P. & Slocum, A. (2004). Precision Connector Assembly using Elastic Averaging. Massachusetts Institute of Technology (MIT), Cambridge, MA, American Society for Precision Engineering.

Cross-sectional view of a prior art infrared welded assembly of BMW, Munich, Germany. Believed on the market since about Jan. 1, 2010.

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

STIFFENED MULTI-LAYER COMPARTMENT DOOR ASSEMBLY UTILIZING ELASTIC AVERAGING

TECHNICAL FIELD

The present invention relates to precise location of the components of a multi-layer compartment door assembly which is stiffened, and the layers thereof mutually self-aligned, via elastic averaging.

BACKGROUND OF THE INVENTION

Multi-layer assemblies are composed of an inner layer and an outer layer, wherein the inner layer mainly provides structural functionality and the outer layer mainly provides a Class A appearance to the multi-layer assembly. As such, these two layers cooperate in tandem to provide both operating durability and pleasing appearance.

When the inner and outer layers are mutually mated to form the multi-layer assembly, consideration must be made for positional (inclusive of dimensional) variance with respect to each of the layers due to manufacturing, as for example as may occur as a result of injection molding processes. Accordingly, in the prior art, the periphery of one layer is allowed to "float" relative to the periphery of the other mating layer during assembly. As such, any variance of the layers can result in a notable mating misalignment which can affect the durability, robustness and strength of the assembly, as well as the fit of the assembly with regard to surrounding components to which it is intended to be placed (e.g., a dashboard and/or a console in which a multi-layer compartment door assembly is installed pivotally therewith).

By way of example, FIGS. 1 through 10 illustrate a prior art multi-layer compartment door assembly 10 used in an automotive environment for the purpose of providing a pivotal compartment door which selectively opens and closes a storage space of a dashboard and/or a console. The multi-layer assembly 10 is composed of an outer layer 12 (best shown at FIG. 1) and an inner layer 14 (best shown at FIG. 2), wherein the outer and inner layers snap together to form the multi-layer assembly.

Figure 1:
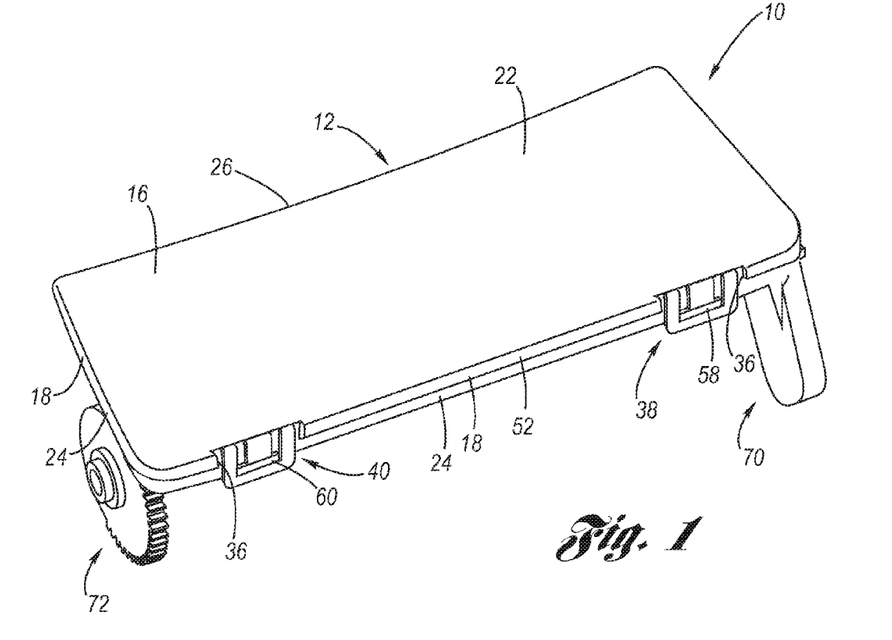
FIG. 1 is a perspective top view of a prior art multi-layer assembly.
Figure 2:
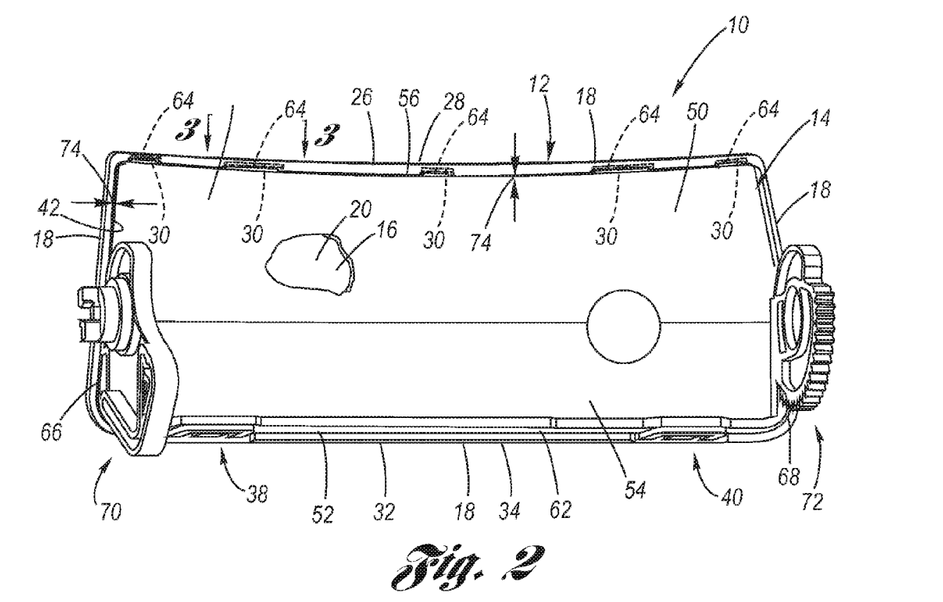
FIG. 2 is a perspective bottom view of the prior art multi-layer assembly of FIG. 1.
Figure 3:
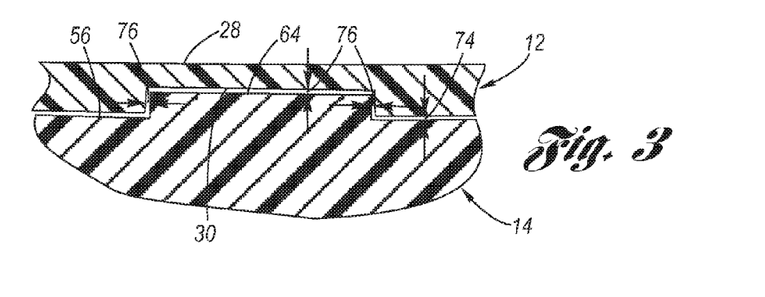
FIG. 3 is an enlarged sectional view of the prior art multi-layer assembly, seen along line 3-3 of FIG. 2.
Figure 4:
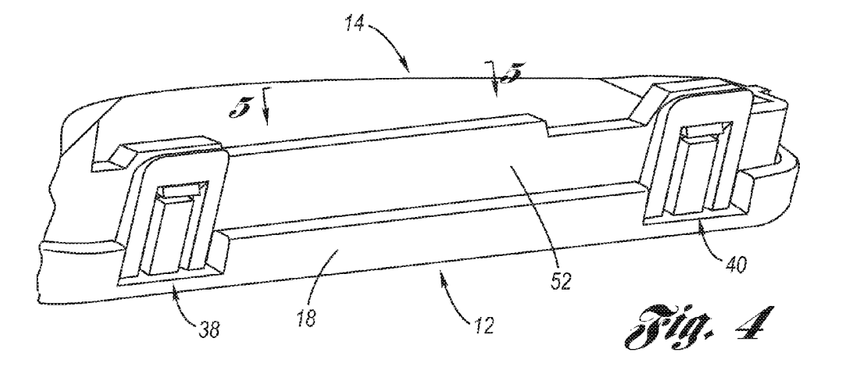
FIG. 4 is a perspective, broken-away view of the second end of the prior art multi-layer assembly of FIGS. 1 and 2.
Figures 5, 6:
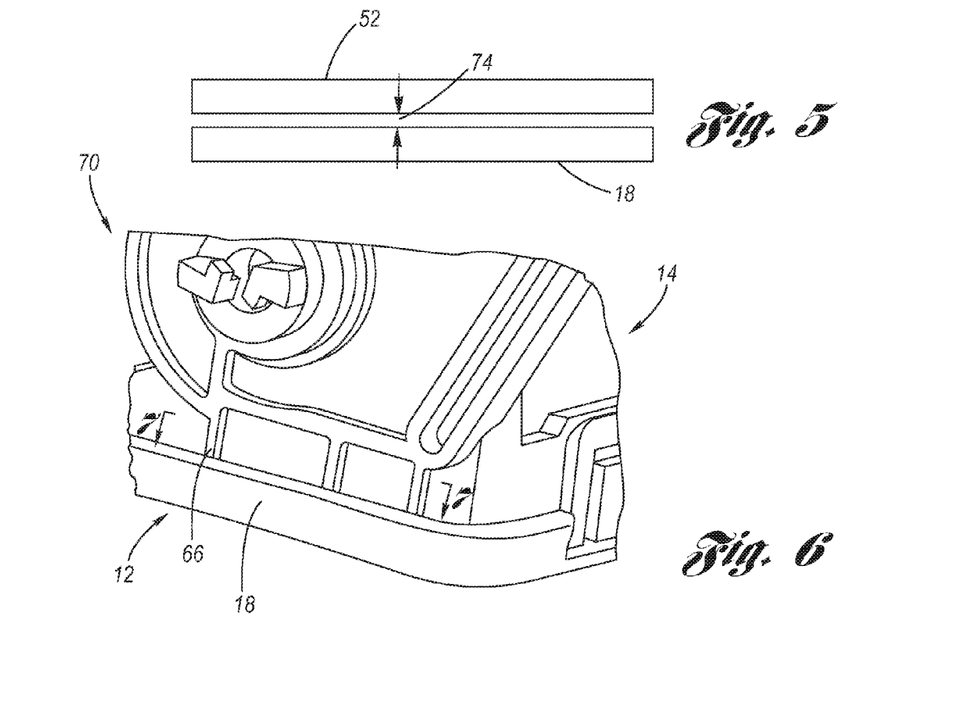
FIG. 5 is a view of the prior art multi-layer assembly of FIGS. 1 and 2, seen along line 5-5 of FIG. 4.
FIG. 6 is a perspective, broken-away first end view of the prior art multi-layer assembly of FIGS. 1 and 2.
Figure 7:
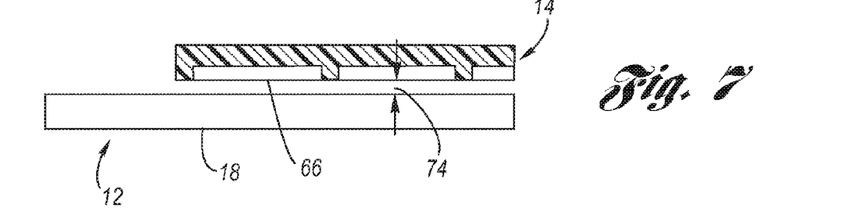
FIG. 7 is a partly sectional view of the prior art multi-layer assembly of FIGS. 1 and 2, seen along line 7-7 of FIG. 6.
Figure 8:
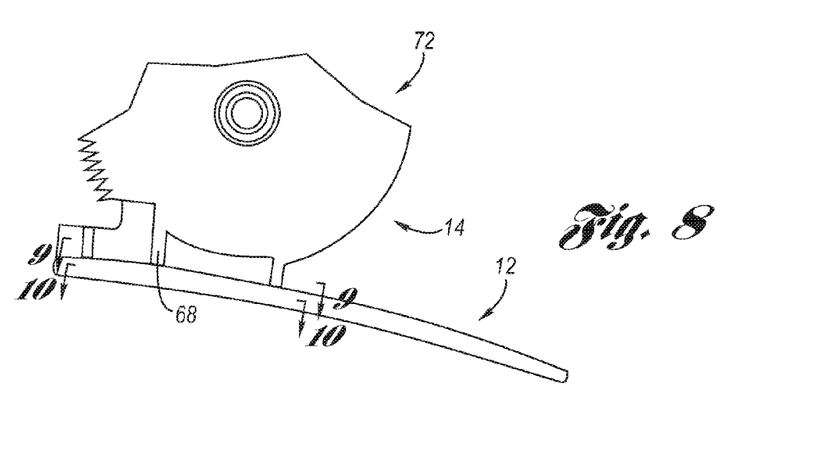
FIG. 8 is a broken-away second end view of the prior art multi-layer assembly of FIGS. 1 and 2.
Figure 9:
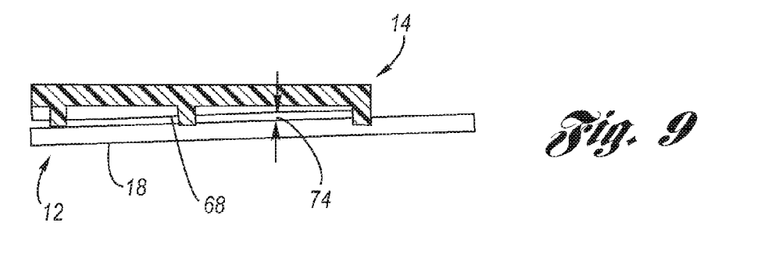
FIG. 9 is a partly sectional view of the prior art multi-layer assembly of FIGS. 1 and 2, seen along line 9-9 of FIG. 8.
Figure 10:
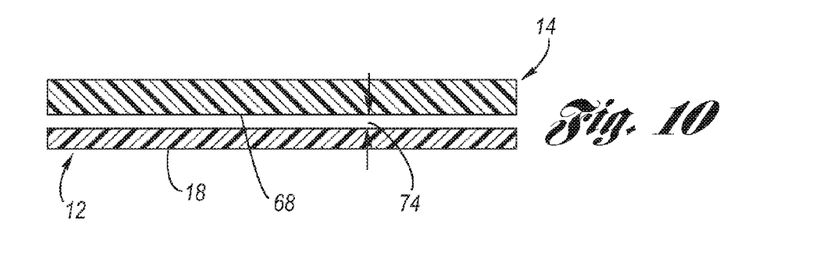
FIG. 10 is a sectional view of the prior art multi-layer assembly of FIGS. 1 and 2, seen along line 10-10 of FIG. 8.

The outer layer 12 includes a generally rectilinear outer panel 16 having a peripheral lip 18 disposed in upstanding perpendicular relation to an interior side 20 of the outer panel (visible at broken-away area in FIG. 2). The opposite, exterior side 22 of the outer panel 16, as well as the exterior side 24 of the peripheral lip 18 has a Class A finish intended to be viewed. A first lip segment 26 of the peripheral lip 18, which is disposed at a first edge 28 of the outer panel 16, is provided with a plurality of mutually spaced apart rectilinear slots 30. A second lip segment 32 of the peripheral lip 18, disposed at a second edge 34 of the outer panel 16 opposite the first edge 28, is interrupted at two locations 36, whereat is respectively disposed first and second snap members 38, 40. The peripheral lip 18 cooperates with the interior side 20 of the outer panel 16 to provide a recessed seat 42.

The inner layer 14 includes a generally rectilinear inner panel 50. At a first edge 56 of the inner panel 50 is disposed a plurality of rectilinear tabs 64, one for each slot 30, wherein when the inner and outer layers are mated each tab is received into its respective slot without interference. An edge lip 52 disposed in upstanding perpendicular relation to a posterior side 54 of the inner panel 50 along a second edge 62 of the inner panel, opposite with respect to the first edge 56. The edge lip 52 carries first and second protuberances 58, 60 which are disposed to snappingly interlock, respectively, with the first and second snap members 38, 40. Between the first and second edges 56, 62 of the inner panel 50, disposed at each end 66, 68 thereof, is a respective pivot mounting member 70, 72. The recessed seat 42 is dimensioned to receive the inner panel 50 with a predetermined clearance 74, such that the first and second edges 56, 62 and the ends 66, 68 are spaced from the peripheral lip 18 sufficient to allow for positional variance. Additionally, each tab 64 is dimensioned with respect to its slot 30 so that there is a preselected clearance 76 (see FIG. 3) which allows for positional variance.

In operation, the inner layer 14 is acutely angled with respect to the outer layer 12 in a manner which permits each tab 64 to be received into its respective slot 30. The inner panel 50 of the inner layer is then pressed into a parallel relation to the outer panel 16 of the outer layer, whereduring the snap members snappingly engage the protuberances and whereupon the inner layer is mated to the outer layer and the multi-layer assembly 10 is provided.

In that there is clearance of the inner layer with respect to the outer layer, in order to take into account positional variance, when assembled, the outer layer 12 may be in an untoward misalignment in relation to the inner layer 14. Not only could this be unsightly and cause the assembly to be less rigid and of less strength than if the first and second layers were precisely aligned with each other, there is also the potential problem that once the multi-layer assembly is installed and now functions as, for example, a compartment door, its placement to surrounding structures may be misaligned, resulting not only in a poor fit with adjacent components, but operational interference with the adjacent components. Additionally, since the mating of the inner and outer layers lacks torsional stiffness due to the clearance gaps mandated by allowance for positional variance, the inner and outer layers need to be thickened in order to provide adequate resistance to offset loading, as when a pressing force is applied upon a non-central portion of the multi-layer assembly.

Accordingly, what remains needed in the art is to somehow provide an alignment modality for the mating of inner and outer layers of a multi-layer assembly, wherein when mating is completed the alignment therebetween is precise and the structural interrelationship is torsionally stiffened.

SUMMARY OF THE INVENTION

The present invention uses elastic averaging to provide precise alignment of mating of the inner and outer layers of a multi-layer assembly, wherein the elastic averaging not only assures precise alignment of the inner and outer layers in relation to each other, but also a torsionally stiffened structural interrelationship therebetween.

The stiffened multi-layer assembly according to the present invention is composed of an inner layer and an outer layer, wherein the inner layer mainly provides structural functionality and the outer layer mainly provides a Class A appearance to the stiffened multi-layer assembly, wherein the inner and outer layers cooperate in tandem to provide a precisely aligned and torsionally stiffened structural interrelationship, long operational durability and pleasing appearance. In this regard, the inner and outer layers are mutually aligned by elastic averaging at the peripheral interface therebetween which provides both a precise alignment and a torsionally stiffened structural configuration when the inner and outer layers are mutually mated and snapped together to form the stiffened multi-layer assembly. By way of a preferred environment of use, but not limitation, the stiffened multi-layer assembly may serve as a compartment door assembly used in an automotive setting for the purpose of providing a pivotal compartment door which selectively opens and closes a storage space of a dashboard and/or a console.

The outer layer includes a generally rectilinear outer panel having a peripheral lip disposed in upstanding perpendicular relation to an interior side of the outer panel. The opposite, exterior side of the outer panel as well as the exterior side of the peripheral lip has a Class A finish intended to be viewed. A first lip segment of the peripheral lip, which is disposed at a first edge of the outer panel, is provided with a plurality of mutually spaced apart trapezoidal slots, the trapezoidal shape being provided by opposing slot sidewalls having obtuse angling with respect to a blind slot wall. A raised second lip segment of the peripheral lip, disposed at a second edge of the outer panel opposite the first edge, is interrupted at two locations, whereat is respectively disposed first and second snap members. The right and left end lip segments of the peripheral lip, each extending between the first and second lip segments, have a raised portion generally consonant with the second lip segment. The peripheral lip cooperates with the interior side of the outer panel to provide a recessed seat.

The inner layer includes a generally rectilinear inner panel. At a first edge of the inner panel is disposed a plurality of compound tabs, one for each trapezoidal slot, wherein when the inner and outer layers are mated, each compound tab is received with an interference fit into its respective trapezoidal slot. In this regard, each compound tab is composed of left and right elastic averaging tab bosses, each spaced in relation to a central tab member, wherein each tab boss interferingly abuts its respective slot sidewall generally adjacent the blind slot wall. An edge lip is disposed in upstanding perpendicular relation to a posterior side of the inner panel along a second edge of the inner panel, disposed in opposite relation with respect to the first edge. The edge lip carries first and second protuberances which are disposed to snappingly interlock, respectively, with the first and second snap members. Additionally, the edge lip further carries a plurality of elastic averaging edge lip bosses configured to interferingly abut the second lip segment. Between the first and second edges of the inner panel is disposed at each end thereof a respective pivot mounting member. A plurality of elastic averaging end bosses are disposed at a base of each of the pivot mounting members and interferingly abut the raised portion of the respective left and right end lip segments of the outer layer when the inner and outer layers are mutually mated.

While the recessed seat is dimensioned to receive the inner panel with clearance generally similar to the prior art, in accordance with the present invention elastic averaging is provided between the inner and outer layers when the inner panel is seated in the seat. In this regard, elastic averaging occurs at each of the right and left end lip segments by interfering abutment with the respective end bosses, as well as diametrically therebetween, and elastic averaging occurs at the edge lip by interfering abutment with the edge lip bosses and at the slot sidewalls by interfering abutment with the tab bosses, as well as diametrically between the edge lip bosses and the tab bosses to collectively provide an elastic averaging which accommodates positional variance.

In operation, the inner layer is acutely angled with respect to the outer layer in a manner which permits each compound tab to be received into its respective trapezoidal slot. As this occurs, each tab boss is pressed by its respective obtuse angled slot sidewall into the space between it and its respective central tab member, thereby elastically averaging the disposition of the compound tabs with respect to the trapezoidal slots. The inner panel of the inner layer is then pressed into a parallel relation to the outer panel of the outer layer, whereduring the snap members snappingly engage the protuberances, while simultaneously the edge lip bosses press against the raised second lip segment of the outer layer and the end bosses press against the raised portion of the left and right end lip segments, thereby further elastically averaging the disposition of the inner layer with respect to the outer layer. Upon completion of mating, the inner and outer layers are precisely aligned by the elastic averaging, and torsionally stiffened by the interference fit cooperatively provided by the tab bosses, the edge lip bosses and the end bosses so as to provide a resilient interaction between the inner and outer layers, whereby the stiffening serves to transfer a portion of an off-central load applied to the outer layer to the inner layer via the peripheral lip.

Accordingly, it is an object of the present invention to provide an elastic averaged mating between inner and outer layers of a multi-layer assembly, wherein the elastic averaging provides both precise alignment and a stiffened structural interrelationship.

This and additional objects, features and advantages of the present invention will become clearer from the following specification of a preferred embodiment.

DESCRIPTION OF THE PREFERRED EMBODIMENT

Referring now to the Drawings, FIGS. 11 through 21 depict various examples of the structure and function of the stiffened multi-layer assembly 100 according to the present invention.

Figure 11:
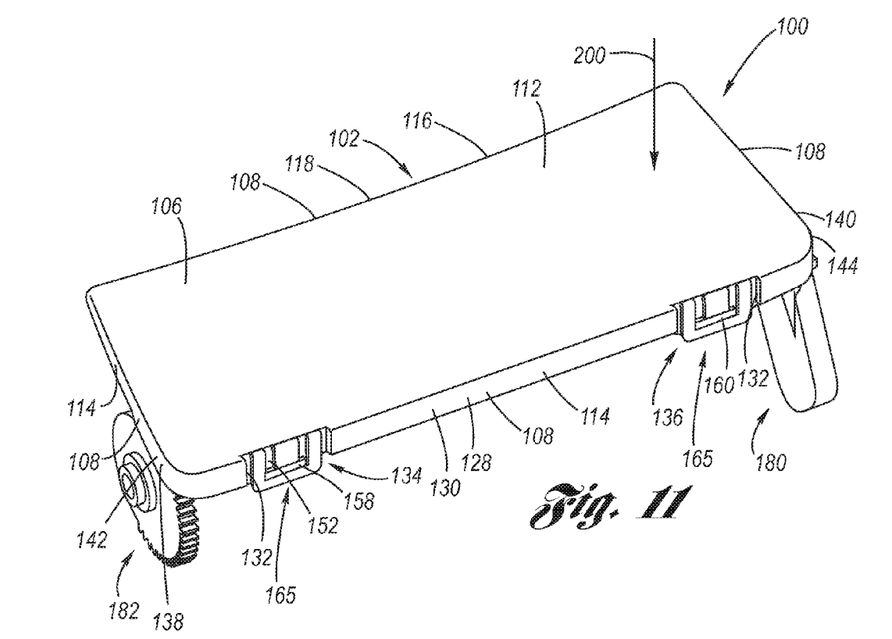
FIG. 11 is a perspective top view of a stiffened multi-layer assembly according to the present invention.
Figure 12:
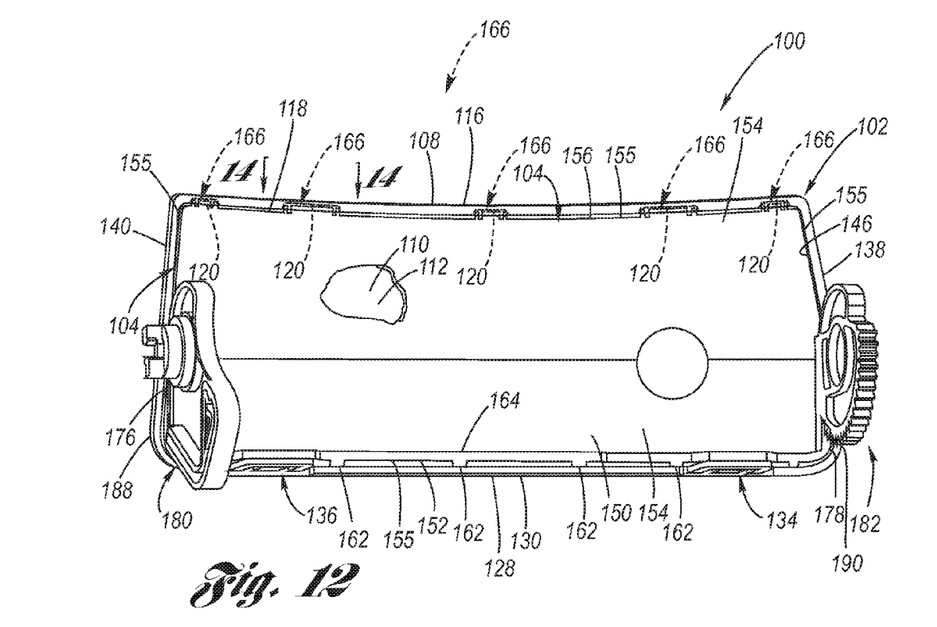
FIG. 12 is a perspective bottom view of the stiffened multi-layer assembly of FIG. 11.

The stiffened multi-layer assembly 100 is composed of an outer layer 102 and an inner layer 104, wherein the inner layer mainly provides structural functionality and the outer layer mainly provides a Class A appearance to the stiffened multi-layer assembly. The outer and inner layers 102, 104 cooperate in tandem to provide a precisely aligned and torsionally stiffened structural interrelationship, long operational durability and pleasing appearance. Elastic averaging at the peripheral interface of the outer and inner layers 102, 104, as detailed hereinbelow, provides both a precise alignment and a torsionally stiffened structural configuration when the outer and inner layers are mutually mated and snapped together to thereby form the stiffened multi-layer assembly 100. By way of a preferred environment of use, but not limitation, the stiffened multi-layer assembly 100 may serve as a compartment door assembly used in an automotive setting for the purpose of providing a pivotal compartment door which selectively opens and closes a storage space of a dashboard and/or a console. For example in this regard, trim components of a dashboard and/or a console are disposed adjacent the compartment door assembly, wherein the precise alignment of the outer and inner layers 102, 104 with respect to each other translates to a precise positioning of the compartment door assembly with respect to the trim components, whereby the operational movement (e.g., pivoting of the compartment door assembly with respect to the trim components) is precisely aligned and free of interference, and whereby a portion of an off-central load applied to the compartment door assembly to effect its (typically spring loaded) opening/closing is torsionally transferred at the periphery from the outer layer to the inner layer.

Figure 13:
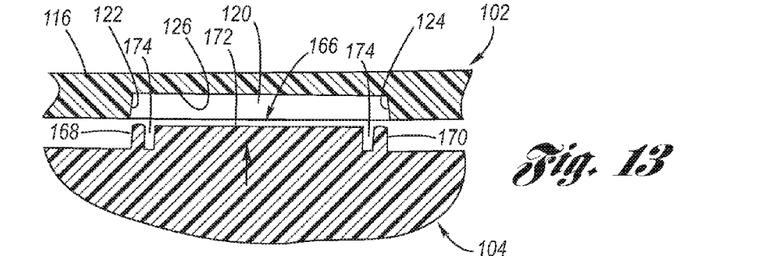
FIG. 13 is an enlarged sectional view of a compound tab of an inner layer positioned for being inserted into a trapezoidal slot of an outer layer in accordance with the present invention.

The outer layer 102 includes a generally rectilinear outer panel 106 having a peripheral lip 108 disposed in upstanding perpendicular relation to an interior side 110 of the outer panel. The opposite, exterior side 112 of the outer panel 102 as well as the exterior side 114 of the peripheral lip 108 has a Class A finish intended to be viewed. A first lip segment 116 of the peripheral lip 108, which is disposed at a first edge 118 of the outer panel 102, is provided with a plurality of mutually spaced apart trapezoidal slots 120. As best shown at FIG. 13, the trapezoidal shape being provided by mutually opposing slot sidewalls 122, 124 having obtuse angling, as for non-limiting example at about 120 degrees, with respect to a blind slot wall 126 of the trapezoidal slot. A raised second lip segment 128 of the peripheral lip 108 (raised, that is, in relation to the first lip segment), is disposed at a second edge 130 of the outer panel, oppositely with respect to the first edge 118, is interrupted at two locations 132, whereat is respectively disposed first and second snap members 134, 136. Right and left end lip segments 138, 140 of the peripheral lip 108, each extending between the first and second lip segments 116, 128, have a raised portion 142, 144. The peripheral lip 108 cooperates with the interior side 110 of the outer panel 102 to provide a recessed seat 146.

Figure 14:
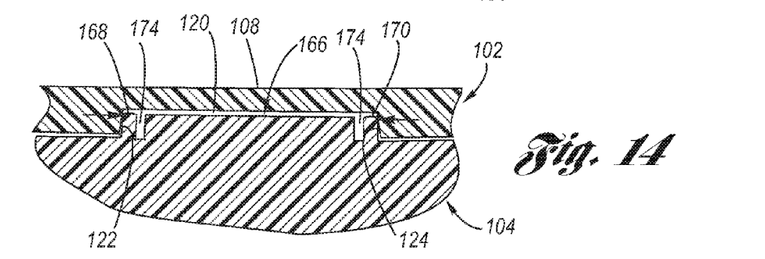
FIG. 14 is an enlarged sectional view of the compound tab now shown fully inserted into the trapezoidal slot of FIG. 13, as seen along line 14-14 of FIG. 12.
Figure 15:
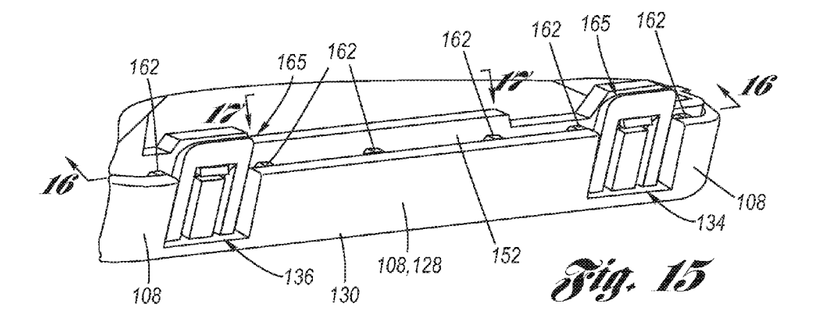
FIG. 15 is a perspective, broken-away view of the second end of the stiffened multi-layer assembly of FIGS. 11 and 12.
Figures 16, 17:
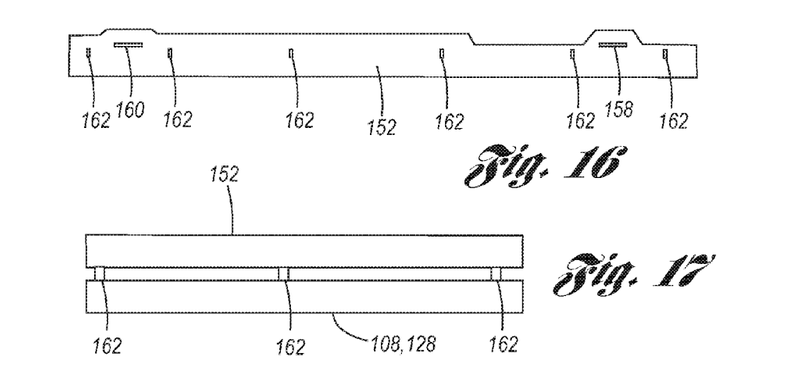
FIG. 16 is an elevational view of a second lip segment of the inner layer, seen along line 16-16 of FIG. 15.
FIG. 17 is a view of the stiffened multi-layer assembly of FIGS. 11 and 12, seen along line 17-17 of FIG. 15.
Figure 18:
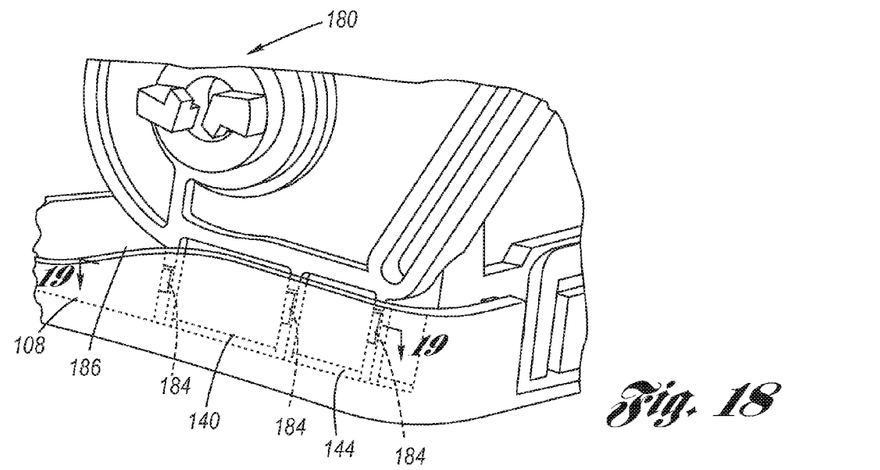
FIG. 18 is a perspective, broken-away first end view of the stiffened multi-layer assembly of FIGS. 11 and 12.
Figure 19:
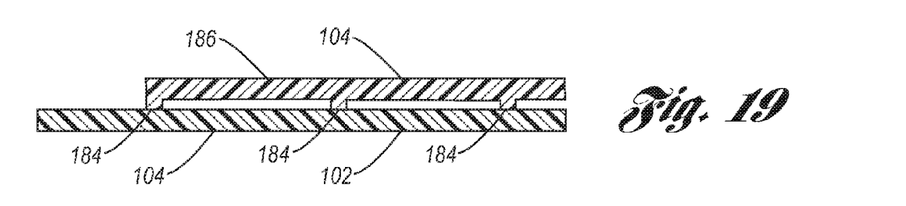
FIG. 19 is a sectional view of the stiffened multi-layer assembly of FIGS. 11 and 12, seen along line 19-19 of FIG. 18.
Figure 20:
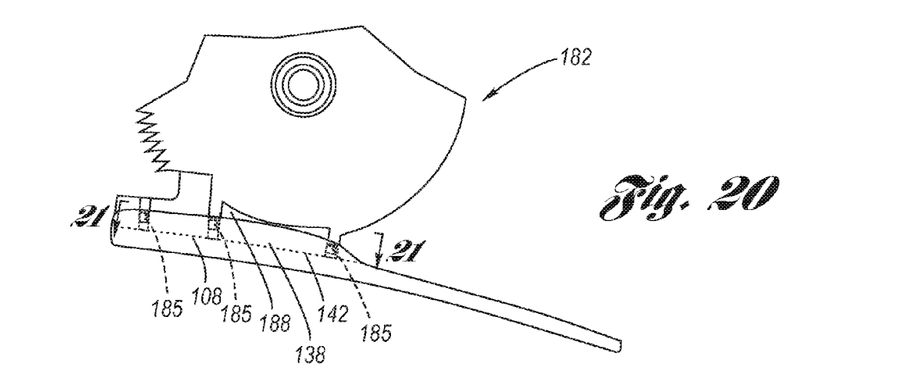
FIG. 20 is a broken-away second end view of the stiffened multi-layer assembly of FIGS. 11 and 12.
Figure 21:
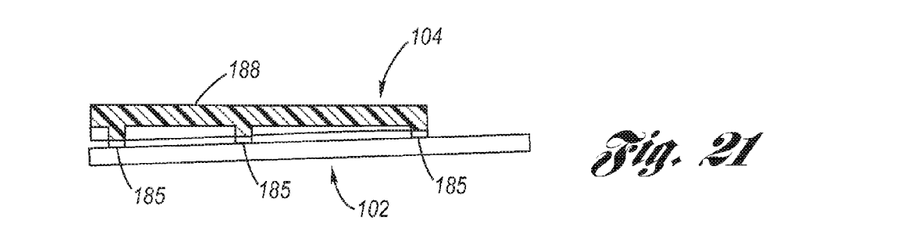
FIG. 21 is a partly sectional view of the stiffened multi-layer assembly of FIGS. 11 and 12, seen along line 21-21 of FIG. 20.

The inner layer 104 includes a generally rectilinear inner panel 150 having a peripheral edge 155. At a first edge 156 of the peripheral edge 155 of the inner panel 104, is disposed a plurality of compound tabs 166, one for each trapezoidal slot 120, wherein when the inner and outer layers 102, 104 are mated, each compound tab is interferingly received into its respective trapezoidal slot, as depicted at FIG. 14. In this regard and as best shown at FIG. 13, each compound tab 166 is composed of left and right elastic averaging tab bosses 168, 170, each separated in relation to a central tab member 172 by a respective tab boss spacing 174, wherein each tab boss interferingly abuts its respective slot sidewall adjacent the blind slot wall 126 when the inner and outer panels are mutually mated, as shown at FIG. 14. An edge lip 152 is disposed in upstanding perpendicular relation to a posterior side 154 of the inner panel along a second edge 164 of the peripheral edge 155 of the inner panel, in opposite relation to the first edge 156. The edge lip 152 carries first and second protuberances 158, 160 which are disposed to snappingly interlock, respectively, with the first and second snap members 134, 136. The combination of each of said first and second snap member with its respective first and second protuberances collectively forming a snap mechanism 165. Additionally, the edge lip 152 further carries a plurality of elastic averaging edge lip bosses 162 configured to interferingly abut the raised second lip segment 128 of the outer layer 102 when the inner and outer layers are mutually mated. At left and right end edges 176, 178 of the peripheral edge 155, a respective left and right pivot mounting member 180, 182 is disposed. A plurality of elastic averaging left end bosses 184 are disposed at a left base 186 of the left pivot mounting member 180 (see FIG. 18), and a plurality of elastic averaging right end bosses 185 are disposed at a right base 186 of the right pivot mounting member 182 (see FIG. 20). The left and right end bosses 184, 185 interferingly abut the respective raised portion 142, 144 of the respective left and right end lip segments 138, 140 at the respective left and right ends 188, 190 of the outer layer 104 when the inner and outer layers are mutually mated.

While the seat 146 is dimensioned to receive the peripheral edge 155 of the inner panel 150 with clearance generally similar to the prior art (e.g., as per FIGS. 1 through 10 as discussed hereinabove), in accordance with the present invention elastic averaging is provided between the outer and inner layers 102, 104 when the inner panel is seated in the seat. In this regard, elastic averaging occurs at each of the right and left end lip segments 138, 140 by interfering abutment with the respective left and right end bosses 184, 185, as well as diametrically therebetween, and elastic averaging occurs at the edge lip 152 by interfering abutment with the edge lip bosses 162 and at the trapezoidal slots 120 by interfering abutment with the tab bosses 168, 170, as well as diametrically between the edge lip bosses and the tab bosses to collectively provide an elastic averaging which accommodates positional variance.

In operation, the inner layer 104 is acutely angled with respect to the outer layer 102 in a manner which permits each compound tab 166 to be received into its respective trapezoidal slot 120. As this occurs, each tab boss 168, 170 is pressed by its respective obtuse angled slot sidewall 122, 124 into the tab boss spacing 174 therebetween, whereby elastic averaging of the disposition of the compound tabs with respect to the trapezoidal slots occurs. The inner panel 150 of the inner layer is then pressed into a parallel relation to the outer panel 106 of the outer layer, whereduring the snap members 134, 136 snappingly engage the protuberances 158, 160, and the edge lip bosses 162 press against the raised second lip segment 128 of the outer layer and the left and right end bosses 184, 185 press against the respective raised portion 142, 144 of the left and right end lip segments 138, 140, thereby further elastically averaging the disposition of the inner layer with respect to the outer layer. Upon completion of mating, the inner and outer layers are precisely aligned by the elastic averaging, and the multi-layer assembly is torsionally stiffened by the interference fit cooperatively provided by the tab bosses, the edge lip bosses and the end bosses so as to provide a resilient interaction between the inner and outer layers, whereby the stiffening serves to transfer a portion of an off-central load 200 (see FIG. 11) applied to the outer layer to the inner layer at the peripheral lip 108.

Thus, it is understood from the foregoing that the multi-layer assembly 100 is provided when the inner panel 150 is seated in the seat 146 of said outer layer 102. When the inner panel is seated in the seat, the outer layer is precisely aligned with respect to said inner layer by elastic averaging provided by: a) resilient flexing of each left and right tab boss in relation to its respectively interferingly abutting slot sidewall, 2) resilient flexing of at least one of the edge lip and the peripheral lip by interfering abutment of the plurality of edge lip bosses with respect to the peripheral lip, 3) resilient flexing of the raised portion of the peripheral lip by interfering abutment with the plurality of left end bosses, and 4) resilient flexing of the raised portion of the peripheral lip by interfering abutment with the plurality of right end bosses. Further, when the inner panel is seated in the seat, the elastic averaging also provides torsional stiffening of the outer layer with respect to the outer layer, wherein any non-central load applied to the outer layer is torsionally transferred at the peripheral lip from the outer layer to the inner layer.

Mathematically, the precise alignment during mating of the outer and inner layers 102, 104 by elastic averaging minimizes the positional variance to Y, defined by $Y=X/\sqrt{N}$, where X is the positional variance and N is the number of elastic averaging bosses provided. By way of example, given twenty two elastic averaging bosses (e.g., per the embodiment shown in the Drawings, ten left and right tab bosses 168, 170; three left end bosses 184, three right end bosses 185; and six edge lip bosses 162 representing up/down and cross car dispositions of the elastic averaging bosses along the peripheral lip 108), then the positional variance is reduced by seventy-five percent, and clearances needed for assembly are eliminated.

A number of advantages of the stiffened multi-layer assembly 100 are provided, including: torsional stiffening allowing for thinner inner and outer layers, precise alignment of the inner and outer layers, precise fit and operational relationship of the stiffened multi-layer assembly with respect to adjacent trim structures, and improved assembly dimensional stability.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:
1. A stiffened multi-layer assembly, comprising:
an outer layer comprising:
an outer panel having a periphery; and
a peripheral lip connected with said outer panel and disposed at said periphery thereof, said peripheral lip having a first lip segment having formed therein a plurality of slots, each slot having a pair of slot sidewalls, wherein said outer panel and said peripheral lip form a seat; and
an inner layer comprising:
an inner panel having a first edge and an oppositely disposed second edge; said inner panel further having left and right edges extending between said first and second edges;
a plurality of tabs connected with said inner panel at said first edge thereof, one tab for each respective slot, each tab comprising a pair of tab bosses;
an edge lip connected with said inner panel at said second edge;
a plurality of edge lip bosses being disposed in mutually spaced relation on said edge lip;
a plurality of left end bosses disposed at said left end; and
a plurality of right end bosses disposed at said right end;
wherein said multi-layer assembly comprises said inner panel being seated in said seat of said outer layer, wherein said outer layer is precisely aligned with respect to said inner layer by elastic averaging.

2. The stiffened multilayer assembly of claim 1, wherein said elastic averaging comprises: a) resilient flexing of each said tab boss in relation to its respective interferingly abutting slot sidewall, b) resilient flexing of at least one of said edge lip and said peripheral lip by interfering abutment of said plurality of edge lip bosses with respect to said peripheral lip, c) resilient flexing of said peripheral lip by interfering abutment with said plurality of left end bosses, and d) resilient flexing of said peripheral lip by interfering abutment with said plurality of right end bosses.

3. The stiffened multi-layer assembly of claim 2, wherein:
each said slot comprises a trapezoidal slot, each trapezoidal slot comprising a blind slot wall and mutually opposing first and second slot sidewalls, each of said first and second slot sidewalls being obtusely angled with respect to said blind slot wall; and
each said tab comprising a compound tab connected with said inner panel at said first edge thereof, a compound tab for each respective trapezoidal slot, wherein said pair of tab bosses comprise a left tab boss and a right tab boss, each compound slot comprising said left and right tab bosses and a central tab member disposed between said left and right tab bosses, wherein said left and right tab bosses are separated from said central tab member by a respective a tab boss spacing
wherein the elastic averaging is further provided by resilient flexing of each said left and right tab boss in relation to the respective one of said left and right sidewall to which it interferingly abuts.

4. The stiffened multi-layer assembly of claim 2, further comprising a plurality of snap mechanisms disposed at said lip edge and said second lip segment;
wherein said snap mechanisms snappingly retain said inner panel received in said recess of said outer panel;
wherein when said inner panel is snappingly retained in said recess, said elastic averaging further provides torsional stiffening of said outer layer with respect to said inner layer; and
wherein said torsional stiffening causes a portion of an off-central load applied to the outer layer to be torsionally transferred via said peripheral lip from said outer layer to said inner layer.

5. The stiffened multi-layer assembly of claim 3, wherein said elastic averaging provides a minimization in positional variance Y as between said outer and inner layers, defined generally by $Y=X/\sqrt{N}$, where X is the positional variance and N is the number of said left and right tab bosses, right end bosses, left end bosses and edge lip bosses provided.

6. The stiffened multi-layer assembly of claim 5, further comprising a left pivot mounting member connected to said left edge of said inner panel by a left base, and a right pivot mounting member connected to said right edge of said inner panel by a right; wherein said left end bosses are disposed at said left base and said right end bosses are disposed at said right base.

7. The stiffened multi-layer assembly of claim 6, wherein N equals twenty two.

8. The stiffened multi-layer assembly of claim 5, wherein:
each said slot comprises a trapezoidal slot, each trapezoidal slot comprising a blind slot wall and mutually opposing first and second slot sidewalls, each of said first and second slot sidewalls being obtusely angled with respect to said blind slot wall; and
each said tab comprising a compound tab connected with said inner panel at said first edge thereof, a compound tab for each respective trapezoidal slot, wherein said pair of tab bosses comprise a left tab boss and a right tab boss, each compound slot comprising said left and right tab bosses and a central tab member disposed between said left and right tab bosses, wherein said left and right tab bosses are separated from said central tab member by a respective a tab boss spacing
wherein the elastic averaging is further provided by resilient flexing of each said left and right tab boss in relation to the respective one of said left and right sidewall to which it interferingly abuts.

9. The stiffened multi-layer assembly of claim 8, further comprising a left pivot mounting member connected to said left edge of said inner panel by a left base, and a right pivot mounting member connected to said right edge of said inner panel by a right; wherein said left end bosses are disposed at said left base and said right end bosses are disposed at said right base.

10. The stiffened multi-layer assembly of claim 9, wherein N equals sixteen.

11. A stiffened multi-layer assembly, comprising:
an outer layer comprising:
an outer panel having a periphery;
a peripheral lip connected with said outer panel and disposed at said periphery thereof, said peripheral lip having a first lip segment, said first lip segment having formed therein a plurality of trapezoidal slots, each trapezoidal slot comprising a blind slot wall and mutually opposing first and second slot sidewalls, each of said first and second slot sidewalls being obtusely angled with respect to said blind slot wall;
wherein said outer panel and said peripheral lip form a seat; and
an inner layer comprising:
an inner panel having a first edge and an oppositely disposed second edge, said inner panel further having left and right edges extending between said first and second edges;
a plurality of compound tabs connected with said inner panel at said first edge thereof, a compound tab for each respective trapezoidal slot, each compound slot comprising:
a pair of left and right tab bosses;
a central tab member disposed between said left and right tab bosses, wherein said left and right tab bosses are separated from said central tab member by a respective a tab boss spacing;
an edge lip connected with said inner panel at said second edge;
a plurality of edge lip bosses being disposed in mutually spaced relation on said edge lip;
a plurality of left end bosses disposed at said left end; and
a plurality of right end bosses disposed at said right end;
wherein when said inner panel is seated in said recess, said outer layer is precisely aligned with respect to said inner layer by elastic averaging comprising: a) resilient flexing of each said left and right tab boss in relation to its respectively interferingly abutting slot sidewall, b) resilient flexing of at least one of said edge lip and said peripheral lip by interfering abutment of said plurality of edge lip bosses with respect to said peripheral lip, c) resilient flexing of said peripheral lip by interfering abutment with said plurality of left end bosses, and d) resilient flexing of said peripheral lip by interfering abutment with said plurality of right end bosses.

12. The stiffened multi-layer assembly of claim 11, further comprising:
a plurality of snap mechanisms disposed at said lip edge and said second lip segment, wherein said snap mechanisms snappingly retain said inner panel received in said recess of said outer panel;
wherein when said inner panel is snappingly retained in said recess, said elastic averaging further provides torsional stiffening outer layer with respect to said inner layer; and
wherein said torsional stiffening causes a portion of an off-central load applied to the outer layer to be torsionally transferred via said peripheral lip from said outer layer to said inner layer.

13. The stiffened multi-layer assembly of claim 12, wherein said elastic averaging provides a minimization in positional variance Y as between said outer and inner layers, defined generally by $Y=X/\sqrt{N}$, where X is the positional variance and N is the number of left and right tab bosses, right end bosses, left end bosses and edge lip bosses provided.

14. The stiffened multi-layer assembly of claim 13, wherein said peripheral lip further comprises:
a second lip segment disposed in opposing relation to said first lip segment; and
left and right end lip segments disposed between said first and second lip segments;
wherein said second lip segment and a portion of each of said left and right end lip segments are raised in relation to said first lip segment; and
wherein said plurality of edge lip bosses interferingly abut said raised second lip portion, said left end bosses interferingly abut said raised portion of said left end lip segment, and said right end bosses interferingly abut said raised portion of said right end lip segment.

15. The stiffened multi-layer assembly of claim 14, further comprising a left pivot mounting member connected to said left edge of said inner panel by a left base, and a right pivot mounting member connected to said right edge of said inner panel by a right; wherein said left end bosses are disposed at said left base and said right end bosses are disposed at said right base.

16. The stiffened multi-layer assembly of claim 15, wherein N equals twenty two.

* * * * *